(12) United States Patent
Kaladoukis et al.

(10) Patent No.: US 12,147,576 B2
(45) Date of Patent: Nov. 19, 2024

(54) SYSTEMS AND METHODS FOR AD HOC SYNTHETIC PERSONA CREATION

(71) Applicant: Wells Fargo Bank, N.A., San Francisco, CA (US)

(72) Inventors: Chris Theodore Kalaboukis, San Jose, CA (US); Andres J. Saenz, Redmond, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/195,275

(22) Filed: May 9, 2023

(65) Prior Publication Data

US 2023/0274030 A1 Aug. 31, 2023

Related U.S. Application Data

(63) Continuation of application No. 17/112,837, filed on Dec. 4, 2020, now Pat. No. 11,720,709.

(51) Int. Cl.
*G06F 21/62* (2013.01)
*G06F 3/0481* (2022.01)
*G06F 3/04842* (2022.01)
*H04L 9/40* (2022.01)

(52) U.S. Cl.
CPC ........ *G06F 21/6254* (2013.01); *G06F 3/0481* (2013.01); *G06F 3/04842* (2013.01); *H04L 63/0421* (2013.01); *G06F 2221/2115* (2013.01)

(58) Field of Classification Search
None
See application file for complete search history.

(56) References Cited

U.S. PATENT DOCUMENTS

| | | | |
|---|---|---|---|
| 8,694,357 B2 | 4/2014 | Ting et al. | |
| 9,501,639 B2 | 11/2016 | Stolfo et al. | |
| 9,537,814 B2 | 1/2017 | Rubinstein et al. | |
| 9,560,075 B2 | 1/2017 | Goldberg et al. | |
| 10,270,808 B1 | 4/2019 | Sherif et al. | |
| 10,333,977 B1 | 6/2019 | Shamul et al. | |
| 10,375,059 B1 * | 8/2019 | Fieldman | G09B 5/02 |
| 10,424,034 B1 * | 9/2019 | Wang | G06F 21/6263 |
| 10,430,830 B2 | 10/2019 | Glover et al. | |
| 10,554,601 B2 | 2/2020 | Rubinstein et al. | |

(Continued)

*Primary Examiner* — Haimei Jiang
(74) *Attorney, Agent, or Firm* — Foley & Lardner LLP

(57) ABSTRACT

A system includes one or more processors coupled to machine readable storage media having instructions stored therein that, when executed by the one or more processors, cause the one or more processors to perform operations including receiving user data of a user including authentic user demographic data, storing the user data in an authentic user profile, receiving a request for a user profile from a third party, generating a synthetic user profile including synthetic user data based on the authentic user profile where generating the synthetic user profile comprises generating synthetic demographic data that is similar to the authentic user demographic data within a predetermined threshold, storing the synthetic user profile in a user profile database where the stored synthetic user profile is associated with the authentic user profile and the third party, and providing the synthetic demographic data to a third party device associated with the third party.

17 Claims, 4 Drawing Sheets

(56) References Cited

U.S. PATENT DOCUMENTS

| | | |
|---|---|---|
| 10,565,276 B2 | 2/2020 | Finder |
| 10,601,868 B2 | 3/2020 | Wilcox |
| 2009/0299945 A1 | 12/2009 | Hangartner |
| 2010/0077483 A1 | 3/2010 | Stolfo et al. |
| 2010/0235623 A1 | 9/2010 | Simpson et al. |
| 2012/0131657 A1 | 5/2012 | Sunstein et al. |
| 2013/0263226 A1 | 10/2013 | Sudia |
| 2013/0318199 A1* | 11/2013 | Le Jouan ............... H04L 67/53 709/217 |
| 2014/0095613 A1 | 4/2014 | Bhardwaj et al. |
| 2015/0082448 A1* | 3/2015 | Elovici ............... G06Q 10/107 726/26 |
| 2015/0188941 A1 | 7/2015 | Boshmaf et al. |
| 2015/0207789 A1* | 7/2015 | Kumar ................. H04L 63/08 726/6 |
| 2016/0004778 A1 | 1/2016 | Finder |
| 2016/0092699 A1* | 3/2016 | Riva ................. H04L 63/0421 726/26 |
| 2016/0277444 A1 | 9/2016 | Keromytis et al. |
| 2016/0371729 A1* | 12/2016 | Glover ............... G06Q 30/0248 |
| 2017/0134405 A1 | 5/2017 | Ahmadzadeh et al. |
| 2017/0243238 A1* | 8/2017 | Kosai ................. G06Q 30/0277 |
| 2018/0300505 A1* | 10/2018 | Chakraborty ....... G06F 21/6254 |
| 2018/0357434 A1* | 12/2018 | Roy .................... G06F 21/6209 |
| 2020/0012900 A1* | 1/2020 | Walters ............... G06F 16/2423 |
| 2020/0012933 A1 | 1/2020 | Truong et al. |
| 2020/0084239 A1* | 3/2020 | Sherif ................. H04L 63/1466 |
| 2021/0099431 A1* | 4/2021 | Wasicek ............. G06F 21/6263 |
| 2021/0099454 A1* | 4/2021 | Rahimi ................. H04L 63/102 |
| 2021/0232706 A1* | 7/2021 | Peruski ................. G06N 20/00 |
| 2021/0326652 A1* | 10/2021 | Hazard ................. G06N 5/045 |
| 2021/0385196 A1* | 12/2021 | Rahmat ............... H04L 63/1408 |

\* cited by examiner

SYSTEMS AND METHODS FOR AD HOC SYNTHETIC PERSONA CREATION

CROSS-REFERENCE TO RELATED APPLICATIONS

This application is a continuation of U.S. patent application Ser. No. 17/112,837 filed Dec. 4, 2020, which is incorporated herein by reference in its entirety and for all purposes.

TECHNICAL FIELD

The present disclosure relates to creating a profile for a user required to create a profile or provide user data and also wishes to remain anonymous. More specifically, this application relates to systems and methods for creating and managing ad hoc synthetic profiles.

BACKGROUND

Many third party internet based websites and applications require personal information of a user to use the website or application. The user may not consider the third party to be reliable or trustworthy, and therefore the user may prefer to not share personal information. Even if the user does consider the third party to be reliable or trustworthy, the user may nonetheless prefer not to share personal information for other reasons. In such cases, a user may enter fake information instead of their personal information. However, entering fake information is problematic when the user again wishes to interact with the third party but has been unable to remember the information that the user previously provided the third party. Furthermore, some third parties can identify accounts that have been registered with fake personal information and will delete or suspend such accounts.

SUMMARY

One embodiment relates to a system comprising a processing circuit including a processor coupled to machine readable storage media having instructions stored therein that, when executed by the processor, cause the processor to perform operations. The operations comprise receiving user data, wherein the user data includes authentic user identification data and authentic user demographic data. The operations further comprise storing the user data as an authentic user profile. The operations further comprise receiving a request for a user profile of the user form a third party. The operations further comprise determining required data fields for the requested user profile. The operations further comprise generating a synthetic user profile including synthetic user data based on the authentic user profile and the required data fields. Generating the synthetic user profile comprises anonymizing the user identification data by generating synthetic user identification data that is different from the authentic user identification data and generating synthetic demographic data that is similar to the authentic demographic data. The operations further comprise storing the synthetic user profile in a user profile database. The stored synthetic user profile is associated with the authentic user profile and the third party. The operations further comprise populating the required data fields with the synthetic user data.

Another embodiment relates to a non-transitory computer readable media having computer-executable instructions embodied therein that, when executed by a processor of a user device, cause the user device to perform operations. The operations comprise receiving user data, wherein the user data includes authentic user identification data and authentic user demographic data. The operations further comprise storing the user data as an authentic user profile. The operations further comprise receiving a request for a user profile of the user form a third party. The operations further comprise determining required data fields for the requested user profile. The operations further comprise generating a synthetic user profile including synthetic user data based on the authentic user profile and the required data fields. Generating the synthetic user profile comprises anonymizing the user identification data by generating synthetic user identification data that is different from the authentic user identification data and generating synthetic demographic data that is similar to the authentic demographic data. The operations further comprise storing the synthetic user profile in a user profile database. The stored synthetic user profile is associated with the authentic user profile and the third party. The operations further comprise populating the required data fields with the synthetic user data.

Another embodiment relates to a method. The method comprises receiving, by a user device, user data, wherein the user data includes authentic user identification data and authentic user demographic data. The method further comprises storing, by the user device, the user data as an authentic user profile of the user. The method further comprises receiving, by the user device, a request for a user profile of the user from a third party. The method further comprises determining, by the user device, required data fields for the requested user profile. The method further comprises generating, by the user device, a synthetic user profile including synthetic user data based on the authentic user profile and the required data fields. Generating the synthetic user profile comprises anonymizing the user identification data by generating synthetic user identification data that is different form the authentic user identification data and generating synthetic demographic data that is similar to the authentic demographic data. The method further comprises storing, by the user device, the synthetic user profile in a user profile database, wherein the stored synthetic user profile is associated with the authentic user profile and the third party. The method further comprises populating, by the user device, the required data fields with the synthetic user data.

This summary is illustrative only and is not intended to be in any way limiting. Other aspects, inventive features, and advantages of the devices or processes described herein will become apparent in the detailed description set forth herein, taken in conjunction with the accompanying Figures, wherein like reference numerals refer to like elements.

DETAILED DESCRIPTION

Figure 1:
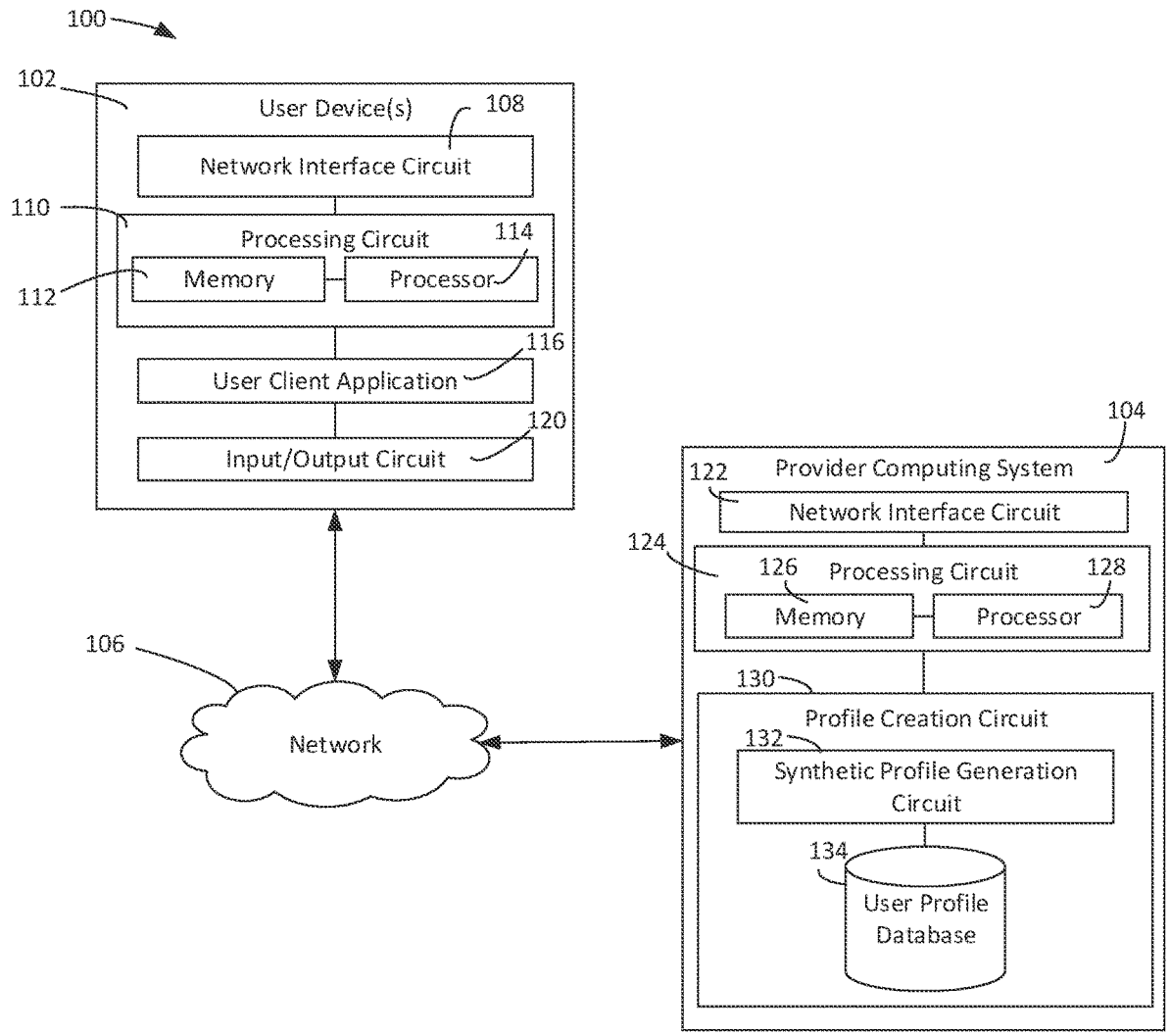
FIG. 1 is a block diagram illustrating a synthetic user profile creation system, according to an example embodiment.

Referring generally to the figures, systems and methods for generating and providing a synthetic profile are shown and described. The systems and methods enhance data security and provide anonymity for users while providing accurate demographic information to third parties.

For example, the user can provide user data via a user device that is added to a user profile and stored in memory or remote from the user device in a database. When a user accesses a third party website or application that requires user data, the system can generate synthetic data based on the authentic user data and provide the synthetic data to the third party. This is beneficial as many websites can be unsecure and prone to data breaches. Additionally, by providing synthetic data, if the third party sells the user data, the authentic user data remains secure and unaffected.

The user can further set trusted third parties that can acquire authentic user data upon request. This can be beneficial as the user can remain anonymous when using an online shopping platform, but provide the necessary information to trusted third parties to ensure correct billing and shipping information is provided, thus allowing for a successful transaction. This is beneficial as the user can ensure that a trusted third party is completing the transaction and receiving a shipping address.

Additionally, a user can be notified when a non-trusted third party has requested access to the user's authentic user data. The notification can include the name of the third party as well as the requested user data. The notification can further include a safety rating of the third party that is based on previous data breaches of the third party and if the third party is known to sell user data, among other factors. This is beneficial as the user can be notified as to what information of the user is being requested.

The embodiments disclosed herein further provide a technical improvement to user interfaces to increase the efficiency of using electronic devices by presenting the user a graphical user interface which lists the synthetic user profiles previously generated. The list of previously generated synthetic user profiles can be adjusted in real time to provide the more frequently utilized synthetic user profiles first, or closest to a particular location on a screen when the user accesses the user interface (e.g., near a top-left corner, centered on the user interface or on the display screen of the user device, nearest an icon indicating the most used synthetic user profiles, nearest an icon indicating synthetic user profiles for used for certain categories such as social media. Additionally, the embodiments disclosed herein provide a technical improvement to synthetic profile generation by allowing the user to view a recently used synthetic profile without opening a user client application. The user may access information regarding the recently used synthetic profile by hovering over the application and/or pressing and holding an icon representing the user client application to cause a popup to be displayed indicating a last-used synthetic user profile or indicating a most-used synthetic user profile.

Referring now to FIG. 1 a block diagram illustrating a synthetic user profile creation system 100 is shown, according to an example embodiment. The synthetic user profile creation system 100 can include a user device 102, a provider computing system 104, and a network 106. The user device 102 may be a computing device, such as a wearable or non-wearable computing device. Wearable computing devices refer to any type of device that an individual wears including, but not limited to, a watch (e.g., a smart watch), glasses (e.g., eye glasses, sunglasses, smart glasses, etc.), bracelet (e.g., a smart bracelet), etc. The user device 102 may also by other types of computing devices including, but not limited to, a phone (e.g., smart phone), a tablet, a laptop, a desktop computer, a personal digital assistant, etc.

The user device 102 is shown to include a network interface circuit 108, a processing circuit 110, a user client application 116, and an input/output circuit 120. The network interface circuit 108 is configured to couple to and establish connections with other computing systems via the network 106. The network interface circuit 108 includes program logic that facilitates connection of the user device 102 to the network 106. For example, the network interface circuit 108 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 108 includes the hardware and machine-readable media sufficient to support communication over multiple channels of data communication. Further, in some arrangements, the network interface circuit 108 includes cryptography capabilities to establish a secure or relatively secure communication session in which data communicated over the session is encrypted.

To provide certain functions of the user device 102, the network interface circuit 108 provides a relatively high-speed link to the network 106, which may be any combination of a local area network (LAN), an intranet (e.g., a private banking or retailer network), the Internet, or any other suitable communications network, either directly or through another external interface.

The processing circuit 110 includes a memory 112 coupled to a processor 114. The memory 112 includes one or more memory devices (e.g., RAM, NVRAM, ROM, Flash Memory, hard disk storage) that store data and/or computer code for facilitating the various processes described herein. That is, in operation and use, the memory 112 stores at least portions of instructions and data for execution by the processor 114 to control the functionality of the processing circuit 110. Moreover, the memory 112 may be or include tangible, non-transient volatile memory or non-volatile memory. The processor 114 may be implemented as one or more processors, application specific integrated circuits (ASICs), field programmable gate arrays (FPGAs), digital signal processors (DSPs), groups of processing components, or other suitable electronic processing components. As such, the user device 102 is configured to run a variety of application programs and store associated data in a database of the memory 112. One such application may be the user client application 116.

The user client application 116 may be provided by, hosted by, or otherwise coupled to the provider computing system 104, such that the user client application 116 may be also referred to as a provider client application 116 or provider institution client application 116 herein. The user client application 116 is communicably coupled via the network interface circuit 108 over the network 106 to the provider computing system 104. The user client application 116 may be downloaded by the user device 102 prior to its usage. The user client application 116 can be hard coded into the memory 112 of the user device 102, or be a web-based interface application such that the user device 102 may provide a web browser to the application, which may be executed remotely from the user device 102. In the latter instance, the user may have to log onto or access the web-based interface before usage of the application. Further, and in this regard, the user client application 116 may be supported, at least partly, by a separate computing system including one or more servers, processors, network interface circuits, etc. that transmit certain features and functionalities to the user device 102. In certain embodiments, the user client application 116 includes an application programming interface (API) and/or a software development kit (SDK) that facilitate the integration of other applications with the user client application 116. In the example shown, the user client application 116 is downloaded to the user device 102, stored by the memory 112, and executed by the processor 114.

In one embodiment and as shown, the user client application 116 generates and provides by a display of the user device 102 graphical user interfaces that allow the user to interact with the user client application 116. One such interaction can allow the user to provide the user client application 116 with user data. The user data can also be referred to as authentic user data and provided user data. The provided user data can be user identification data and user demographic data, as described below. Based on the received user data, the user client application 116 can generate a user profile including all of the received user data. The user client application 116 may require the user to provide authentication (e.g., password, biometric data). By receiving the authentication of the user, the profile can be accessed by a multitude of user devices (e.g., smart phone, tablet, laptop computer, desktop computer). The user client application 116 can then transmit the user profile to the provider computing system 104 to be stored in a database and/or stored in the memory 112 of the user device 102. In one embodiment, the user may passively engage (e.g., hover a cursor over, press and hold icon on touch screen) with an icon associated with the user client application 116. In this instance, the user client application 116 may generate a pop-up that provides information relating to the most recently used synthetic user profile. The provided information can include the date it was used, the third party it was used with, the synthetic user data provided, etc. This may be beneficial as the user may wish to quickly receive information about the last synthetic user profile used without opening the user client application 116.

The user client application further allows the user to update user data as the user data changes. For example, the user may have previously provided the user client application 116 with their income of $50,000 per year. When the user received a raise and now makes $60,000 per year, the user can update their listed income by the user client application 116 through the user device 102. When the updated user data is received, the user client application 116 can update the synthetic profiles associated with the user profile.

In some embodiments, the user client application 116 can be structured to provide the user a list of all generated synthetic profiles. The user can select an icon associated with each generated synthetic profile to review and modify the synthetic user data. In some embodiments the list of synthetic user profiles can be updated and reordered to list the most commonly used synthetic profiles first. In another embodiment, the synthetic user profiles can be ordered based on the date they were generated and/or last used. In some embodiments, the user client application 116 can be structured to allow the user to view and modify synthetic user profiles generated by the synthetic profile generation circuit 132, as described herein. The user may view the synthetic profiles and review which third parties received which synthetic profiles. In some embodiments, the user client application 116 is structured to allow the user to modify the synthetic user profiles. In some embodiments, the modifications are limited to a determined range (e.g., 5%, 10%). For example, the user may have a birth date of Nov. 9, 1995. In this instance, the user may be able to modify the birthdate to list Sep. 30, 1997, but not Nov. 18, 1972 as it is outside of a determined age range of 10%.

In some embodiments, the user is able to save and set a particular synthetic profile for a certain category of third party requestor via the user client application 116. For example, the user may wish to have a particular synthetic profile utilizing the name Scott for all third parties that are determined to be social media platforms. In this instance, the user may select the synthetic profile with the name Scott and select the profile to represent the user data for social media platforms via a drop down menu, check box, etc. In some embodiments, a single synthetic user profile can represent the user data in all or multiple categories. In some embodiments, the user may instruct the synthetic profile generation circuit 132 via the user client application 116 of the user device 102 to generate a synthetic profile for every third party.

In some embodiments, the user client application 116 can prompt the user to provide a list of third parties that can access user data upon request. The user can be provided with a drop down menu, checklist, etc. of third parties that are commonly trusted to receive user data (e.g., USPS, UPS, FedEx, Amazon, Walmart). The list of commonly trusted third parties can further include a safety rating. The safety rating can include an analysis of previous data breaches, if the company sells user data, what percentage of users trust the third party, etc.

In some embodiments, the user client application 116 can be structured to provide the user device 102 with a notification (e.g., pop-up notification, push notification, email, text) when a third party has requested user data. For example, the user may have provided a synthetic profile to an online shopping website and made a purchase. In this instance, the shipping service (e.g., USPS, UPS, FedEx) may reference a database of synthetic user profiles provided by the provider computing system 104 to determine the user data is synthetic. The shipping service may then request the user data via the provider computing system 104 wherein a notification is sent to the user device 102 via the user client application 116. In some embodiments, the notification can include a safety rating of the third party as described above. The user client application 116 is structured to receive an input from the notification provided to the user to allow or not allow the third party to receive authentic user data. In the instance where the user allows the third party access to authentic user data, the user may be authenticated. The authentication can include providing a password, biometric data, two factor authentication, etc. For example the user may receive a notification that a third party has requested authentic user data. The user can accept the request by the third party through the user client application 116. Based on the accepted response, the user may be prompted to be authenticated by affirming the acceptance on a second user device 102 associated with the user.

The user client application 116 is further structured to set contact rules. In some embodiments, the user can specify contact rules for all emails received by synthetic email addresses. For example, the user may indicate that emails received from a particular profile be sent to a primary email address of the user as indicated in the user data. In another example, the user may indicate that the emails received from a particular profile be sent to the junk folder of the email address of the user or deleted upon receiving. In some embodiments, the user can specify through the user client application 116 the contact rules by a drop down menu, checkbox, etc.

The input/output circuit 120 is structured to receive communications from and provide communications to the user associated with the user device 102. In this regard, the input/output circuit 120 is structured to exchange data, communications, instructions, etc. with an input/output component of the user device 102. Accordingly, in one embodiment, the input/output circuit 120 includes an input/output device. In another embodiment, the input/output circuit 120 includes communication circuitry for facilitating the exchange of data, values, messages, and the like between an input/output device and the components of the user device 102. In yet another embodiment, the input/output circuit 120 includes machine-readable media for facilitating the exchange of information between an input/output device and the components of the user device 102. In still another embodiment, the input/output circuit 120 includes any combination of hardware components, communication circuitry, and machine-readable media.

In some embodiments, the input/output circuit 120 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 120 provides an interface for the user to interact with various applications (e.g., the user client application 116) stored on the user device 102.

As shown in FIG. 1, the synthetic user profile creation system 100 includes a provider computing system 104. The provider computing system 104 may be structured to receive and store user profiles and generate synthetic user profiles. The provider computing system 104 is structured as a backend computing system, such as a discrete server, a group of two or more computing devices/servers, a distributed computing network, a cloud computing network, and/or any other type of computing system capable of accessing and communicating using local and/or global networks (e.g., the network 106). The provider computing system 104 includes a network interface circuit 122, a processing circuit 124, and a profile creation circuit 130.

The processing circuit 124 includes a memory 126 coupled to a processor 128. As shown in FIG. 1, the memory 126 is separate from the user profile database 134. In other embodiments, the memory 126 may include the user profile database 134. The user profile database 134 is configured to retrievably store user profiles including user data and synthetic user profiles including synthetic user data received from a plurality of user devices 102, as described herein. Additionally, the user profile database 134 is configured to retrievably store preferences and settings as set by the user through the user client application 116. In this regard, the user profile database 134 is configured to store a plurality of user profiles including user data (e.g., name, email address, phone number, income, gender) associated with a plurality of synthetic user profiles including synthetic user data.

The processor 128 may be implemented as one or more application-specific integrated circuits (ASICs), field-programmable gate arrays (FPGAs), a group of processing components, or other suitable electronic processing components. The memory 126 may be one or more devices (e.g., RAM, ROM, Flash memory, hard disk storage) for storing data and/or computer code for completing and/or facilitating the various processes described herein. The memory 126 may be or include non-transient volatile memory, non-volatile memory, and non-transitory computer storage media. The memory 126 may include database components, object code components, script components, or any other type of information structure for supporting the various activities and information structures described herein. The memory 126 may be communicably coupled to the processor 128 and include computer code or instructions for executing one or more processes described herein. In some embodiments, the provider computing system 104 is a distributed computing system and includes one or more servers. In this case, provider computing system 104 may include multiple network interface circuits 122 and/or multiple processing circuits 124.

The network interface circuit 122 includes program logic that facilitates coupling of the provider computing system 104 to the network 106. The network interface circuit 122 can support communication between the user device 102 and the provider computing system 104. For example, the network interface circuit 122 can include a cellular modem, a Bluetooth transceiver, a radio-frequency identification (RFID) transceiver, and a near-field communication (NFC) transmitter. In some embodiments, the network interface circuit 122 includes the hardware and machine-readable media sufficient to support communication over multiple channels of data communication. Further, in some embodiments, the network interface circuit 122 includes cryptography capabilities to establish a secure or relatively secure communication session between the user device 102 and the provider computing system 104. In this regard, information (e.g., location information, transaction information, PII, and/or other types of data) may be encrypted and transmitted to prevent or substantially prevent a threat of hacking.

The profile creation circuit 130 is structured to store the user profile and associated synthetic user profiles, as well as settings and/or rules associated with the user of the synthetic profiles, as described herein. The profile creation circuit 130 is further structured to generate synthetic profiles and synthetic user data. The profile creation circuit 130 comprises a synthetic profile generation circuit 132 and a synthetic profile generation circuit 132

The synthetic profile generation circuit 132 is structured to determine a user profile is requested by a third party, generate synthetic user profiles based on the user profile and user data therein, and provide the synthetic user profile to the third party. The synthetic profile generation circuit 132 may be implemented as software code suitable for compilation, object code, executable file(s) and/or code, a set of machine language instructions, and/or in another suitable form for carrying out the computer-implemented method(s) described herein. In some embodiments, the synthetic profile generation circuit 132 may be implemented in a distributed fashion such that at least some of the code is executed and/or compiled on a system that is different from the system hosting the code, executable files, etc. The synthetic profile generation circuit 132 may be structured to interact (exchange data, instructions, electronic signals, etc.) with the user device 102, user client application 116, and/or the user profile database 134, for example, through the API of the respective system and/or application. According to various embodiments, the synthetic profile generation circuit 132 may be deployed to a user device 102 in a "light" fashion such that no installation is required. For example, functionality provided by the synthetic profile generation circuit 132 can be made accessible to the user through a web browser, a browser plug-in with navigable controls, an applet, a virtual application hosted externally to the user device 102 and deployed in a software-as-a-service mode, etc. Alternatively, the functionality provided by the synthetic profile generation circuit 132 can be made accessible to the user via the user device 102 as a fully or partially installed application including executable code packages and the like. As described herein, the user device 102 can utilize the functionality of the synthetic profile generation circuit 132 in many forms. While shown as components of provider computing system 104, the profile creation circuit 130, the synthetic profile generation circuit 132, and the user profile database 134 can instead components of user device 102.

The synthetic profile generation circuit 132 is structured to receive and/or determine a request for a synthetic user profile. In some embodiments, the user can request a synthetic user profile be made by the synthetic profile generation circuit 132 via the user client application 116 of the user device 102. For example, the user may need to fill out paperwork for which the user wishes to use synthetic data. In some embodiments, the synthetic profile generation circuit 132 can determine that the user is required to enter user data. For example, the user may select a data field that requires the user to provide user data. In this instance, the synthetic profile generation circuit 132 can provide a notification to the user (e.g., pop-up, push notification) inquiring whether the user would like to fill in the required user data with synthetic user data. In another instance, the user can hover a mouse over the required data field prompting the synthetic profile generation circuit 132 to provide a notification to the user inquiring whether the user would like to fill in the required user data with synthetic user data.

The synthetic profile generation circuit 132, upon receiving instructions to provide synthetic data by the user, is structured to determine the data fields required by the third party requestor. The synthetic profile generation circuit 132 can determine required data fields by analyzing the graphical user interface provided by the third party requestor to determine indications of required fields (e.g., asterisks, data fields labeled as required). In some embodiments, the synthetic profile generation circuit 132 is structured to inspect the source code of the webpage or application to determine the required data fields. Upon determining the required data fields, the synthetic profile generation circuit 132 is structured to determine the data required for each field (e.g., name, email address, age, income). The synthetic profile generation circuit 132 is further structured to determine the format that the data must be provided (e.g., mm/dd/yy, mm-dd-yyyy).

The synthetic profile generation circuit 132 is further structured to determine a category of the third party requestor. The categories can be determined by comparing the name of the third party with a preset list of commonly accessed third parties. In some embodiments, the category of a third party can be determined by reviewing the third party application and/or website for keywords indicating a category (e.g., social media, shopping, news).

In some embodiments, based on user preferences as set via the user client application 116, the synthetic profile generation circuit 132 can populate the required data fields with synthetic user data included in a previously generated synthetic user profile. For example, the user can indicate that all third party requestors that are determined to be in a social media category are to be populated with a single synthetic user profile.

The synthetic profile generation circuit 132 is structured to generate a synthetic user profile based on the user data in a user profile as provided by the user via the user client application 116. The user data can include user identification data and user demographic data. The user identification data can include any data that can be used to identify a particular user, for example, name, phone number, email address, home/billing address, social security number, device identifier, driver's license number, etc. The user demographic data can include any data that can be used to describe a user, for example, income, family size, age, height, weight, ethnicity, gender, religion, general location (e.g., zip code), favorite sports team, etc.

The synthetic profile generation circuit 132 can utilize portions of the user identification data in the generation of the synthetic user identification data. For example, when generating the synthetic user name, the synthetic profile generation circuit 132 can rearrange all or a portion of the name, including additional letters, to generate the synthetic name. In another embodiment, the synthetic profile generation circuit 132 can utilize a non-standard truncation of the name. For example, the user's name may be Jonathan. In this instance, the synthetic profile generation circuit 132 can generate a synthetic name of Nathan, Nate, Jonah, etc.

In some embodiments, when generating a synthetic address and/or phone number, the synthetic profile generation circuit 132 can include the general location information. For example, when generating a synthetic phone number, the synthetic phone number can have the same area code as the user phone number. Additionally or alternatively, when generating a synthetic address, the synthetic address can have the same zip code and/or city and state as the user address.

In some embodiments, the synthetic profile generation circuit 132 can generate the synthetic user identification data according to a particular set of rules that allow the user identification data to be determined based on the synthetic user identification data (e.g., encrypted and decrypted). These rules can vary for all of the necessary data fields (e.g., name, address, phone number, email address). In some embodiments, trusted third parties can be supplied with the rules (e.g., decryption key) that allows them to determine the user data from the synthetic user data.

In some embodiments, a trusted third party can serve as a trusted vendor that can create a full synthetic data profile of the user and provide the full synthetic data profile to a non-trusted third party. In some embodiments, the trusted vendor can determine authentic user data from a synthetic user profile provided by a third party. For example, a third party can transmit a profile to the trusted vendor that can determine if the profile is a synthetic profile or an authentic profile. If determined to be authentic, the trusted vendor can notify the third party that the profile is an authentic profile. If the trusted vendor determines the profile is synthetic, the trusted vendor can determine authentic user data from the synthetic profile. In some embodiments, the trusted vendor can determine and transmit all of the authentic user data to the third party. In further embodiments, the trusted vendor can determine and transmit particular user data (e.g., address, user age, income). The particular user data can be set by the user, the provider, the need of the third party, etc.

In some embodiments, the synthetic profile generation circuit 132 can generate the synthetic user identification data completely randomly. For example, when generating the synthetic user profile, the synthetic profile generation circuit 132 can randomly assign user identification data. In some embodiments, the generated names can be common names for people of the determined general area (e.g., zip code), gender, and/or age. For example, the user may be a 25-year-old woman from Wisconsin. In this instance, the synthetic profile generation circuit 132 can analyze a list of common names of users in that area with similar ages and genders to determine common first and last names.

In some embodiments, when generating a synthetic user email address, the synthetic profile generation circuit 132 can utilize other synthetic data to generate the synthetic email address. For example, the synthetic profile generation circuit 132 may have generated a synthetic user name of Megan with a synthetic birthdate of May 24, 1995. In this instance, the synthetic profile generation circuit 132 can utilize the synthetic data to create an email address (e.g., Megan.1995@gmail.com). This can be beneficial as third parties may wish to eliminate fake profiles, and try to determine fake profiles by searching for irregular email addresses that do not match user profile data.

The synthetic profile generation circuit 132 can generate synthetic user demographic data based on the authentic user demographic data. In some embodiments, user demographic data that is very general can be used as synthetic user demographic data. For example, the gender, race, general area (e.g., zip code) of a user can be used as the synthetic user demographic data to maintain anonymity of the user while ensuring accurate information is provided to the third party.

In some embodiments, the synthetic user demographic data is different from the user demographic data. For example, numerical synthetic user demographic data (e.g., income, birthdate, height, weight) can be generated to be within a certain range of the user demographic data. In some embodiments, the synthetic user demographic data is within a certain percentage of the user data (e.g., ±5%, ±10%). For example, the user may have a birth date of Nov. 9, 1995. In this instance, the synthetic birthdate can be Sep. 30, 1997, but not Nov. 18, 1972 as it is outside of a determined range of 10%. The range can also be set based on the data field for example, in one embodiment, the synthetic height can have a range of 2 inches from the user height, while the synthetic weight can have a range of 10 pounds from the user weight.

Figure 2:
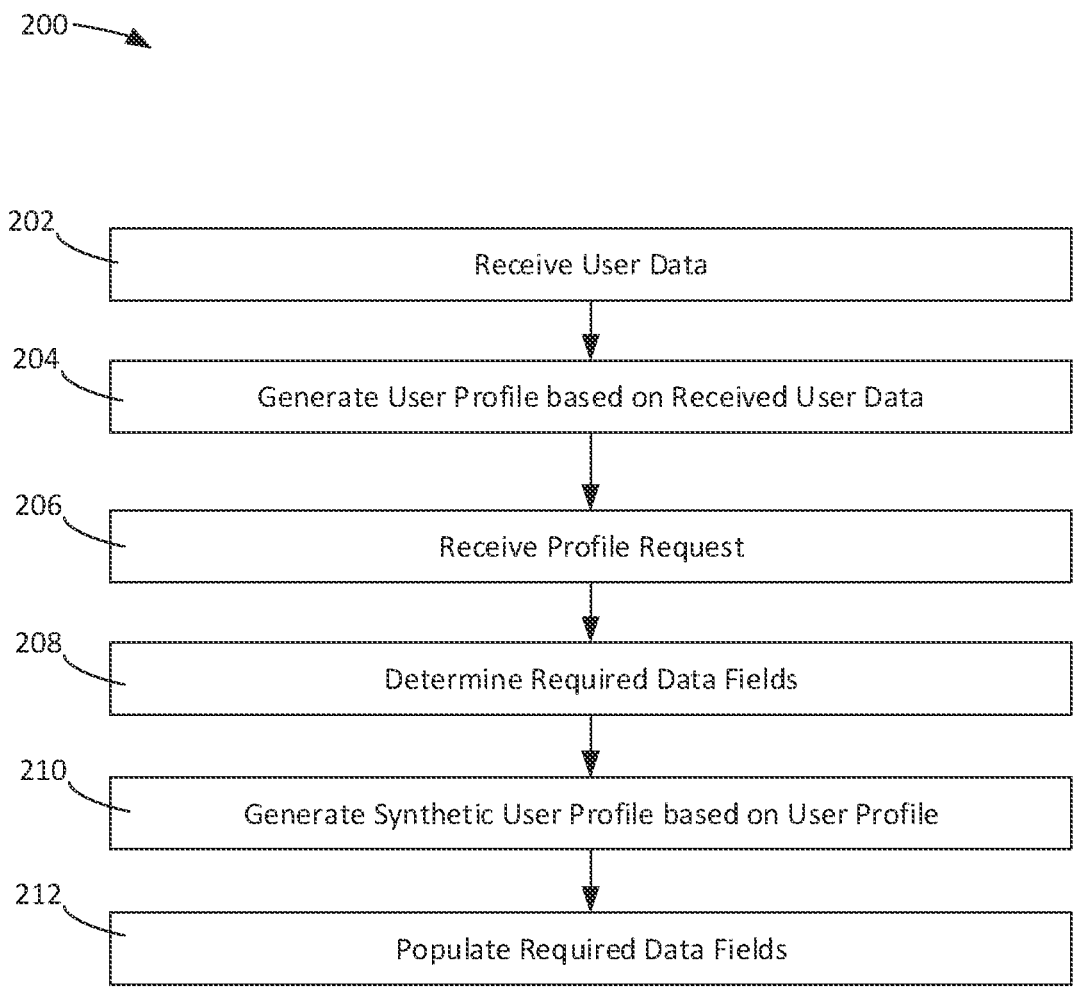
FIG. 2 is a flowchart illustrating a method of generating and providing a synthetic user profile, according to an example embodiment.

Referring now to FIG. 2, a flowchart illustrating a method of generating and providing a synthetic user profile is shown, according to an example embodiment. The method may be performed by the components of FIG. 1, such that reference is made to one or more components of FIG. 1 to aid explanation of the method 200. At step 202, user data is received by a user interface of a user device 102 from a user. The user data can include user identification data and user demographic data, as described above. The user data input can be prompted by a graphical user interface generated by the user device 102.

At step 204, the user client application 116 generates a user profile based on the received user data and any settings specified by the user. The profile can be stored in the memory 112 of the user device 102 and/or transmitted to the provider computing system 104 where it can be stored in the user profile database 134. In some embodiments, the user may access the user profile via the user client application 116 of the user device 102 to update the user data stored in the user profile.

At step 206, the user device 102, utilizing the synthetic profile generation circuit 132 of the provider computing system 104, receives a request to provide a profile to a third party requestor. The request can be an indication by the user via the user device 102 that the user would like to provide a profile to the third party requestor. The request can be determined by a user interacting with a data entry field via the user device 102. For example, the user may touch on a data entry field of a graphical user interface, hover a mouse over the data entry field, right click on a data entry field, etc. In some embodiments, the user can manually request a synthetic profile via the user client application 116 of the user device 102.

At step 208, the user device 102, utilizing the synthetic profile generation circuit 132 of the provider computing system 104, determines the data fields that the third party requires to be populated. The synthetic profile generation circuit 132 can determine required data fields by analyzing the graphical user interface provided by the third party requestor to determine indications of required fields (e.g., asterisks, data fields labeled as required). In some embodiments, the synthetic profile generation circuit 132 is structured to inspect the source code of the webpage or application to determine the required data fields. In some embodiments, the user device 102 further determines the format in which the data must be presented.

At step 210, the user device 102, utilizing the synthetic profile generation circuit 132 of the provider computing system 104, generates a synthetic user profile based on the user profile. The synthetic user profile can include synthetic data based on the user data, as described above. The synthetic user profile can include the data that is determined to be required in step 208.

In some embodiments, the user can set preferences via the user client application 116 to utilize a single synthetic profile for multiple third parties. The user can specify particular synthetic profiles to be used for particular categories of third parties. In this instance, the synthetic profile generation circuit 132 can further determine the category of the third party (e.g., social media, online shopping). Based on the determined category of the third party, the synthetic profile generation circuit 132 can determine if a previously generated synthetic profile can be used, or if a new synthetic profile must be generated. In some embodiments, the user can be presented with a graphical user interface listing previously generated synthetic profiles that the user can choose to reuse. This may be beneficial as the user may wish to reuse synthetic profiles without assigning the synthetic profile to a particular category or group of categories.

In some embodiments, the user can be provided with the option via the user device 102 to utilize authentic user data. This may be beneficial as the user can reduce the amount of time needed and possible errors in entry of information by retrieving the user data from the previously created user profile.

At step 212, the user device 102, utilizing the synthetic profile generation circuit 132 of the provider computing system 104, populates the required data entry fields of the third party user interface with the generated synthetic user profile. In some embodiments, the user can be provided via display by the user device 102, the ability to review and/or revise the synthetic user data before the data entry fields are populated. In some embodiments, the user is restricted to revising certain data fields (e.g., income, birth date) within a predetermined range (e.g., +5%, ±10%).

The user can later update their user data via the user client application 116. In some embodiments, when the user updates the user data, the synthetic user profiles can be update by the synthetic profile generation circuit 132. Upon updating the synthetic user profiles, the provider computing system 104 can transmit the updated synthetic user profiles to the third parties in which they were initially utilized. This can be beneficial as it maintains the anonymity of the user, but provides accurate user data (e.g., +5%, ±10%).

Figure 3:
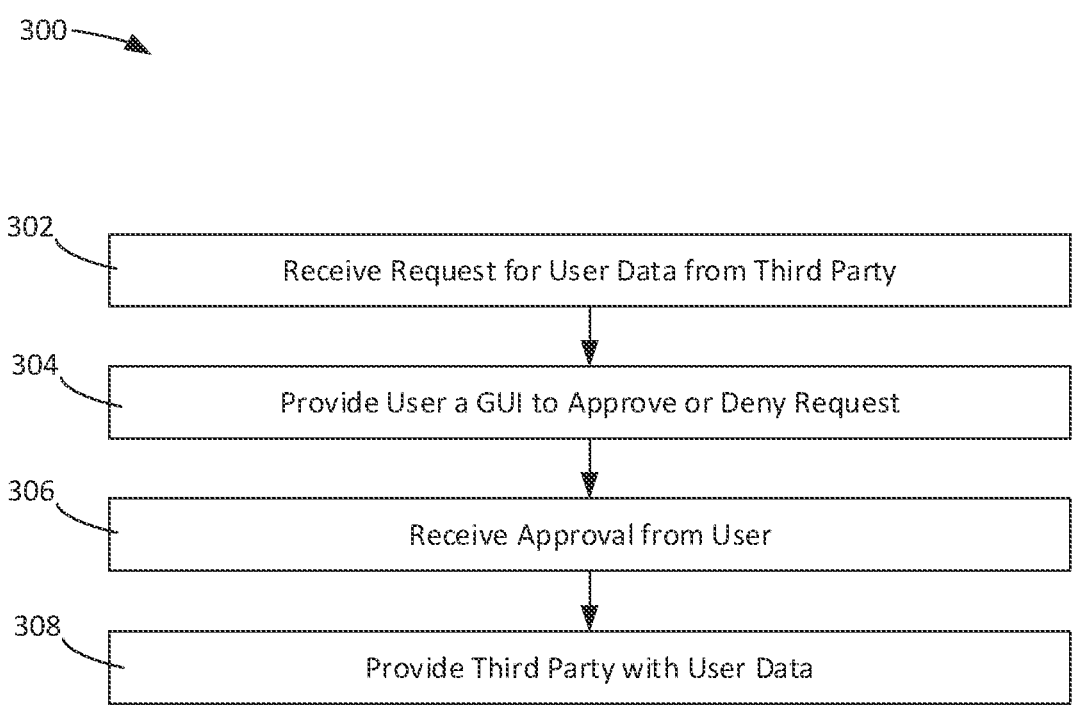
FIG. 3 is a flowchart illustrating a method of providing user data to an approved third party, according to an example embodiment.

Referring now to FIG. 3, a flowchart illustrating a method of providing user data to an approved third party is shown, according to an example embodiment. The method may be performed by the components of FIG. 1, such that reference is made to one or more components of FIG. 1 to aid explanation of the method 300. At step 302, the provider computing system 104 can receive a request for user data from a third party. The request can include the user data provided to the third party. In some embodiments, a plurality of third parties can provide the user data received by the third party to determine if the user data is synthetic user data or authentic user data. In further embodiments, the user data can be generated to include indications that the user data is synthetic (e.g., non-registered address).

In some embodiments, the user can set trusted third parties via the user client application 116 that can access user data without requiring approval from the user. For example, a user can indicate that the United States Postal Service (USPS) is a trusted third party that can receive user data without approval. For example, the user can place an order through an online merchant using a synthetic user profile. When the designated carrier (USPS) receives the request to ship the package, the USPS can submit a request to the provider computing system 104 to receive authentic user data.

At step 304, the user device 102 generates and provides a graphical user interface to the user requesting approval to allow a third party to receive authentic user data. In some embodiments, the request can include the name of the third party and the requested data. In some embodiments, the request can include a safety rating of the third party that indicates the estimated safety of the user data if provided to the third party.

At step 306, the user device 102 receives approval to transmit the authentic user data to the third party. In some embodiments, the user can be provided with a second graphical user interface that provides the user with the option to always provide the third party with authentic user data upon request. In this instance, if the user approves of always providing the third party with authentic user data upon request, the third party is added to a list of trusted third parties.

At step 308, the user device 102 can transmit an indication of the received approval from the user to the provider computing system 104. Upon receiving the indication of approval by the user, the provider computing system 104 can transmit the authentic user data associated with the synthetic user data to the third party. In some embodiments, the requested user data can be transmitted to the third party via the user device 102. This is beneficial as the user may wish to remain anonymous when placing an order on an online shopping website, but needs to provide authentic payment information to pay for the product and provide a authentic name and address to receive the product.

Figure 4:
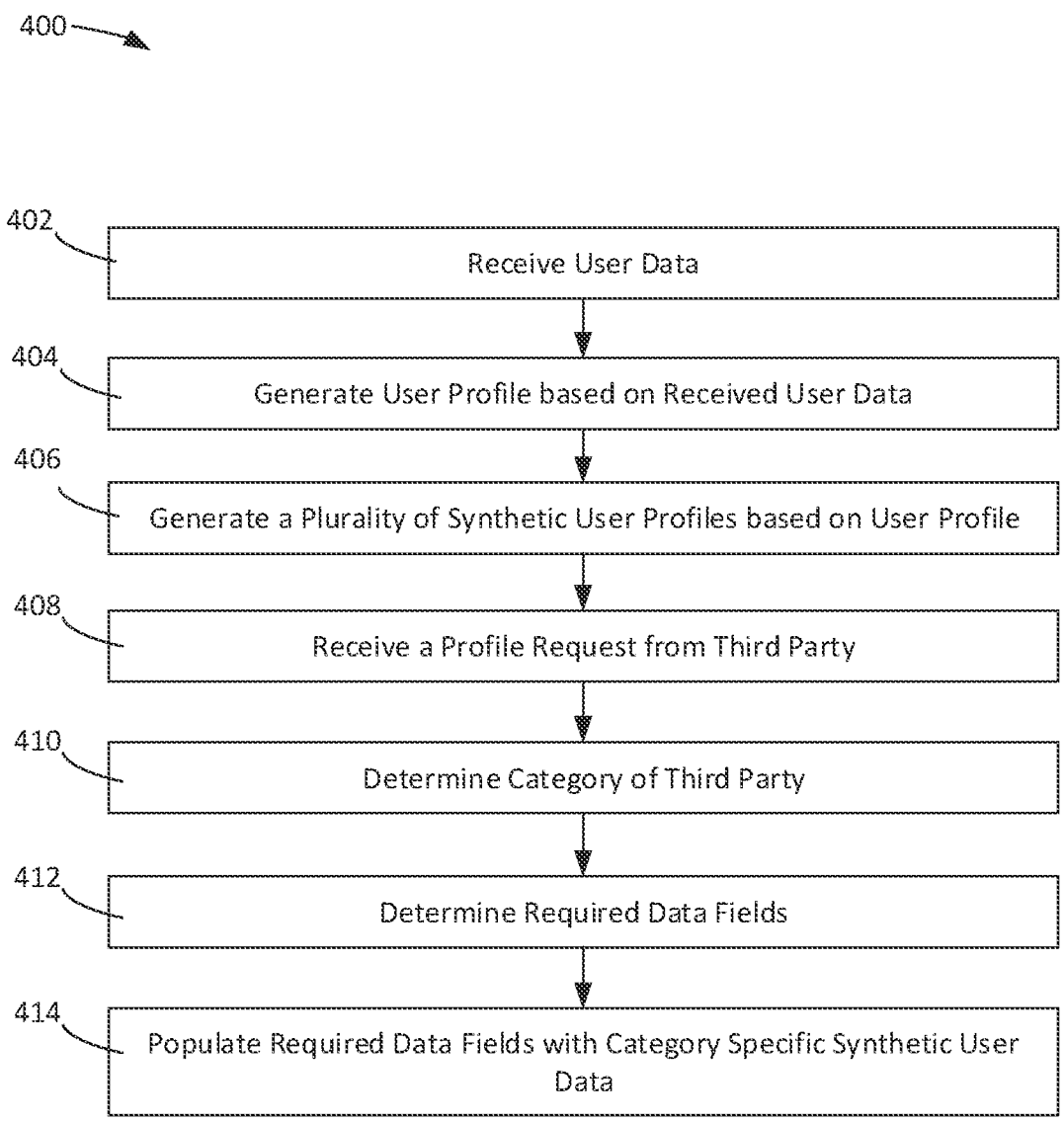
FIG. 4 is a flowchart illustrating a method of generating a plurality of synthetic user profiles and providing a synthetic user profile based on a category of a third party, according to an example embodiment.

Referring now to FIG. 4, a flowchart illustrating a method of generating a plurality of synthetic user profiles and providing a synthetic user profile based on a category of a third party is shown, according to an example embodiment. The method may be performed by the components of FIG. 1, such that reference is made to one or more components of FIG. 1 to aid explanation of the method 400. At step 402, user data is received by a user interface of a user device 102 from a user. The user data can include user identification data and user demographic data, as described above. The user data can be prompted by a graphical user interface generated by the user device 102. The user can further indicate, when providing user data, that the user would like to have separate synthetic profiles for different categories of third parties. For example, the user may wish to have a synthetic profile for all social media platforms, and a separate synthetic profile for online shopping platforms.

At step 404, the user client application 116 generates a user profile based on the received user data. The profile can be stored in the memory 112 of the user device 102 and/or transmitted to the provider computing system 104 where it can be stored in the user profile database 134. In some embodiments, the user may access the user profile via the user client application 116 of the user device 102 to update the user data stored in the user profile.

At step 406, the user device 102, utilizing the synthetic profile generation circuit 132 of the provider computing system 104, generates a plurality of synthetic user profiles based on the user profile. The number of synthetic profiles to be generated can be determined by the number of synthetic profiles predefined by categories at step 202. For example, if the user predefined a first synthetic profile for use in all social media platforms and a second synthetic profile for use in all online shopping platforms, the synthetic profile generation circuit 132 can generate two synthetic user profiles at step 406. In this instance, because the synthetic profile is not generated to populate specifically required data fields, the synthetic profile generation circuit 132 can generate synthetic data for all supplied user data. In some embodiments, more synthetic profiles can be generated than the number of categories to create a queue of generated synthetic profiles for later use.

At step 408, the user device 102, utilizing the synthetic profile generation circuit 132 of the provider computing system 104, receives a request to provide a profile to a third party requestor. The request can be an indication by the user via the user device 102 that the user would like to provide a profile to the third party requestor. The request can be determined by a user interacting with a data entry field via the user device 102. For example, the user may touch on a data entry field of a graphical user interface, hover a mouse over the data entry field, right click on a data entry field, etc. In some embodiments, the user can manually request a synthetic profile via the user client application 116 of the user device 102.

At step 410, the user device 102, utilizing the synthetic profile generation circuit 132 of the provider computing system 104, determines a category of the third party. The categories can be determined by comparing the name of the third party with a preset list of commonly accessed third parties. In some embodiments, the category of a third party can be determined by reviewing the third party application and/or website for keywords indicating a category (e.g., social media, shopping, news).

At step 412, the user device 102, utilizing the synthetic profile generation circuit 132 of the provider computing system 104, determines the data fields that the third party requires to be populated. The synthetic profile generation circuit 132 can determine required data fields by analyzing the graphical user interface provided by the third party requestor to determine indications of required fields (e.g., asterisks, data fields labeled as required). In some embodiments, the synthetic profile generation circuit 132 is structured to inspect the source code of the webpage or application to determine the required data fields.

At step 414, the user device 102, utilizing the synthetic profile generation circuit 132 of the provider computing system 104, populates the required data entry fields of the third party user interface with the category specific generated synthetic user profile. Based on the determination of the category of the third party at step 410 and the determination of the required data entry fields at step 412, the user device 102 populates the data fields of the third party user interface. In some embodiments, the user can be provided via display by the user device 102, the ability to review and/or revise the synthetic user data before the data entry fields are populated. In some embodiments, the user is restricted to revising certain data fields (e.g., income, birth date) within a predetermined range (e.g., ±5%, ±10%).

In some embodiments, the user is provided, via the display of the user device 102, a graphical user interface providing the user the ability to populate the required data entry fields of the third party user interface with authentic user data.

In some embodiments, the third party user interface can specify that the data entry field requires authentic user data. For example, a user may wish to get a quote for a car loan. In this instance, the third party can be a loan provider that specifies that the user must provide a authentic credit score and income. In this instance, the synthetic profile generation circuit 132 can provide synthetic data for all fields besides the data fields that require the user to provide authentic data.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor that, in some example embodiments, may execute instructions stored, or otherwise accessed, via different areas of memory). Alternatively or additionally, the one or more processors is structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system comprising:
    one or more processors coupled to machine readable storage media having instructions stored therein that, when executed by the one or more processors, cause the one or more processors to perform operations, the operations comprising:
        receiving user data of a user, wherein the user data includes authentic user demographic data;
        storing the user data in an authentic user profile;
        receiving a request for a user profile of the user from a third party;
        generating a synthetic user profile including synthetic user data based on the authentic user profile, wherein generating the synthetic user profile comprises generating synthetic demographic data that is within a predetermined threshold of the authentic user demographic data, wherein the synthetic demographic data includes an age, and the predetermined threshold for the age is 10%;
        storing the synthetic user profile in a user profile database, wherein the stored synthetic user profile is associated with the authentic user profile and the third party; and
        providing the synthetic demographic data to a third party device associated with the third party.

2. The system of claim 1, wherein the synthetic user profile includes a plurality of synthetic user profiles for the user including a plurality of synthetic user data.

3. The system of claim 1, wherein the operations further comprise:
    receiving a user data request from the third party, wherein the user data request includes a request for authentic user data and corresponding synthetic user data;
    providing, by a user device, a graphical user interface that displays an option for the user to provide the third party with the authentic user data; and
    providing the authentic user data to the third party based on receiving a selection of the option to provide the third party with the authentic user data from the user device.

4. The system of claim 1, wherein the operations further comprise:
    receiving user preference information indicating a plurality of third parties that are trusted to receive authentic user data;
    receiving a user data request from a trusted third party of the plurality of third parties that are trusted, wherein the user data request includes a request for the authentic user data and corresponding synthetic user data; and
    providing the trusted third party with the authentic user data.

5. The system of claim 1, wherein the operations further comprise:
    receiving an update to the authentic user demographic data; and
    updating the synthetic user data based on the updated authentic user demographic data.

6. The system of claim 5, wherein the operations further comprise:
    providing the updated synthetic user data to the third party device.

7. A non-transitory computer readable media having computer-executable instructions embodied therein that, when executed by one or more processors of a user device, cause the user device to perform operations, the operations comprising:
    receiving user data of a user, wherein the user data includes authentic user demographic data;
    causing the user data to be stored in an authentic user profile;
    receiving a request for a user profile of the user from a third party;
    causing generation of a synthetic user profile including synthetic user data based on the authentic user profile, wherein generation of the synthetic user profile comprises generating synthetic demographic data that is within a predetermined threshold of the authentic user demographic data, wherein the synthetic demographic data includes an age, and the predetermined threshold for the age is 10%, and wherein the synthetic user profile is stored in a user profile database and is associated with the authentic user profile and the third party; and
    providing the synthetic demographic data to a third party device associated with the third party.

8. The non-transitory computer readable media of claim 7, wherein the synthetic user profile includes a plurality of synthetic user profiles for the user including a plurality of synthetic user data.

9. The non-transitory computer readable media of claim 7, wherein the operations further comprise:
    receiving a user data request from the third party, wherein the user data request includes a request for authentic user data and corresponding synthetic user data;

providing, by the user device, a graphical user interface that displays an option for the user to provide the third party with the authentic user data; and
providing the authentic user data to the third party based on receiving a selection of the option to provide the third party with the authentic user data.

10. The non-transitory computer readable media of claim 7, wherein the operations further comprise:
receiving user preference information indicating a plurality of third parties that are trusted to receive authentic user data;
receiving a user data request from a trusted third party of the plurality of third parties that are trusted, wherein the user data request includes a request for authentic user data and corresponding synthetic user data; and
providing the trusted third party with the authentic user data.

11. The non-transitory computer readable media of claim 7, wherein the operations further comprise:
receiving an update to the authentic user demographic data; and
updating the synthetic user data based on the updated authentic user demographic data.

12. The non-transitory computer readable media of claim 11, wherein the operations further comprise:
providing the updated synthetic user data to the third party device.

13. A method comprising:
receiving, by a computing system, user data of a user, wherein the user data includes authentic user demographic data;
storing, by the computing system, the user data in an authentic user profile of the user;
receiving, by the computing system, a request for a user profile of the user from a third party;
generating, by the computing system, a synthetic user profile including synthetic user data based on the authentic user profile, wherein generating the synthetic user profile comprises generating synthetic demographic data that is within a predetermined threshold of the authentic user demographic data, wherein the synthetic demographic data includes an age, and the predetermined threshold for the age is 10%;
storing, by the computing system, the synthetic user profile in a user profile database, wherein the stored synthetic user profile is associated with the authentic user profile and the third party; and
providing, by the computing system, the synthetic demographic data to a third party device associated with the third party.

14. The method of claim 13, wherein the synthetic user profile includes a plurality of synthetic user profiles for the user including a plurality of synthetic user data.

15. The method of claim 13, further comprising:
receiving, by the computing system, a user data request from a third party, wherein the user data request includes a request for authentic user data and corresponding synthetic user data;
providing, by a user device of the computing system, a graphical user interface that displays an option for the user to provide the third party with the authentic user data; and
providing, by the computing system, the authentic user data to the third party based on receiving a selection of the option to provide the third party with the authentic user data.

16. The method of claim 13, further comprising:
receiving, by a user device of the computing system, user preference information indicating a plurality of third parties that are trusted to receive authentic user data;
receiving, by the computing system, a user data request from a trusted third party of the plurality of third parties that are trusted, wherein the user data request includes a request for authentic user data and corresponding synthetic user data; and
providing, by the computing system, the trusted third party with the authentic user data.

17. The method of claim 13, further comprising:
receiving an update to the authentic user demographic data;
updating the synthetic user data based on the updated authentic user demographic data; and
providing the updated synthetic user data to the third party device.

* * * * *